(12) United States Patent
Garg

(10) Patent No.: US 12,737,675 B2
(45) Date of Patent: Sep. 15, 2026

(54) SYSTEMS AND METHODS FOR IMITATION LEARNING

(71) Applicant: The Board of Trustees of the Leland Stanford Junior University, Stanford, CA (US)

(72) Inventor: Divyansh Garg, Stanford, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 925 days.

(21) Appl. No.: 17/812,672

(22) Filed: Jul. 14, 2022

(65) Prior Publication Data

US 2023/0045360 A1 Feb. 9, 2023

Related U.S. Application Data

(60) Provisional application No. 63/221,894, filed on Jul. 14, 2021.

(51) Int. Cl.
*G06N 20/00* (2019.01)
*G06F 17/11* (2006.01)

(52) U.S. Cl.
CPC ............ *G06N 20/00* (2019.01); *G06F 17/11* (2013.01)

(58) Field of Classification Search
CPC ................................ G06N 20/00; G06F 17/11
See application file for complete search history.

(56) References Cited

U.S. PATENT DOCUMENTS

| | | | |
|---|---|---|---|
| 10,896,382 B2 | 1/2021 | Uchibe et al. | |
| 10,896,383 B2 | 1/2021 | Uchibe et al. | |
| 2022/0284281 A1* | 9/2022 | Iwaki | G06N 3/04 |

FOREIGN PATENT DOCUMENTS

| | | |
|---|---|---|
| CN | 101261634 B | 11/2012 |
| CN | 110955239 A | 4/2020 |
| EP | 3839835 A1 | 6/2021 |

OTHER PUBLICATIONS

Garg, Divyansh, Shuvam Chakraborty, Chris Cundy, Jiaming Song, and Stefano Ermon. "Iq-learn: Inverse soft-q learning for imitation." Advances in Neural Information Processing Systems 34 (2021): 4028-4039. (Year: 2021).*

Arenz, Oleg, and Gerhard Neumann. "Non-adversarial imitation learning and its connections to adversarial methods." arXiv preprint arXiv:2008.03525 (2020). (Year: 2020).*

"AlphaStar: Mastering the real-time strategy game StarCraft II", Google DeepMind, accessed 2019, AlphaStar: Mastering the real-time strategy game StarCraft II. https://www.deepmind.com/blog/alphastar-mastering-the-real-time-strategy-game-starcraft-ii, 14 pgs.

(Continued)

*Primary Examiner* — Casey R. Garner
(74) *Attorney, Agent, or Firm* — KPPB LLP

(57) ABSTRACT

Systems and methods for imitation learning in accordance with embodiments of the invention are illustrated. One embodiment includes a method for imitation learning. The method includes steps for initializing a Q-function, training the Q-function using a non-adversarial objective based on a set of one or more expert trajectories, and determining a policy based on the trained Q-function.

20 Claims, 6 Drawing Sheets

(56) References Cited

OTHER PUBLICATIONS

Abbeel et al., "Apprenticeship Learning via Inverse Reinforcement Learning", International conference on Machine learning (ICML), Jul. 4, 2004, 8 pgs., doi: 10.1145/1015330.1015430.
Baram et al., "Model-based Adversarial Imitation Learning", Technion—Israel Institute of Technology, Dec. 7, 2016, 9 pgs., doi:10.48550/arXiv.1612.02179.
Barde et al., "Adversarial Soft Advantage Fitting: Imitation Learning without Policy Optimization", Advances in Neural Information Processing Systems 33, Apr. 16, 2021, 11 pgs., doi: 10.48550/arXiv.2006.13258.
Bloem et al., "Infinite time horizon maximum causal entropy inverse reinforcement learning", IEEE Conference on Decision and Control, 2014, pp. 4911-4916, doi: 10.1109/CDC.2014.7040156.
Chan et al., "Scalable Bayesian Inverse Reinforcement Learning", International Conference on Learning Representations, Mar. 11, 2021, 14 pgs., doi: 10.48550/arXiv.2102.06483.
Fu et al., "Learning Robust Rewards with Adversarial Inverse Reinforcement Learning", International Conference on Learning Representations, Aug. 13, 2018, 15 pgs., doi: 10.48550/arXiv.1710.11248.
Goodfellow et al., "Generative Adversarial Nets", Advances in Neural Information Processing Systems 27 (NIPS 2014), Jun. 10, 2014, 9 pgs.
Gulrajani et al., "Improved Training of Wasserstein GANs", Advances in Neural Information Processing Systems 30 (NIPS 2017), Dec. 25, 2017, 11 pgs., doi: 10.48550/arXiv.1704.00028.
Haarnoja et al., "Reinforcement Learning with Deep Energy-Based Policies", International Conference on Machine Learning, Jul. 21, 2017, 16 pgs., doi: 10.48550/arXiv.1702.08165.
Haarnoja et al., "Soft Actor-Critic: Off-Policy Maximum Entropy Deep Reinforcement Learning with a Stochastic Actor", International Conference on Machine Learning, Aug. 8, 2018, 14 pgs., doi: 10.48550/arXiv.1801.01290.
Hayes et al., "A Robot Controller Using Learning by Imitation", International Symposium on Intelligent Robotics and Systems, 1994, 7 pgs.
Herman et al., "Inverse Reinforcement Learning with Simultaneous Estimation of Rewards and Dynamics", International conference on artificial intelligence and statistics (AISTATS), Apr. 13, 2016, 14 pgs., doi: 10.48550/arXiv.1604.03912.
Ho et al., "Generative Adversarial Imitation Learning", Conference on Neural Information Processing Systems, Jun. 10, 2016, 14 pgs., doi: 10.48550/arXiv.1606.03476.
Jain et al., "Model-Free IRL Using Maximum Likelihood Estimation", AAAI Conference on Artificial Intelligence (AAAI), Jan. 27, 2019, 8 pgs., doi: 10.1609/aaai.v33i01.33013951.
Jarrett et al., "Strictly Batch Imitation Learning by Energy-based Distribution Matching", International Conference on Neural Information Processing Systems, Jan. 14, 2021, 20 pgs., doi: 10.48550/arXiv.2006.14154.
Klein et al., "Batch, Off-Policy and Model-Free Apprenticeship Learning", European Workshop on Reinforcement Learning (EWRL), 2011, 6 pgs.
Kostrikov et al., "Discriminator-actor-critic: Addressing sample inefficiency and reward bias in adversarial imitation learning", International Conference on Learning Representations, Oct. 15, 2018, 14 pgs., doi: 10.48550/arXiv.1809.02925.
Kostrikov et al., "Imitation Learning via Off-Policy Distribution Matching", International Conference on Learning Representations, 2020, 11 pgs.
Kumar et al., "Conservative Q-Learning for Offline Reinforcement Learning", Google Research, Brain Team, Aug. 19, 2020, 31 pgs., doi: 10.48550/arXiv.2006.04779.
Lee et al., "Truly Batch Apprenticeship Learning with Deep Successor Features", International Joint Conference on Artificial Intelligence (IJCAI), Mar. 24, 2019, 10 pgs., doi: 10.48550/arXiv.1903.10077.
Lucic et al., "Are GANs Created Equal? A Large-Scale Study", Advances in Neural Information Processing Systems 31 (NIPS 2018), 2018, 21 pgs.
Miyato et al., "Spectral Normalization for Generative Adversarial Networks", Sixth International Conference on Learning Representations, Feb. 16, 2018, 26 pgs., doi: 10.48550/arXiv.1802.05957.
Mnih et al., "Playing Atari with Deep Reinforcement Learning", Twenty-seventh Conference on Neural Information Processing Systems, Dec. 19, 2013, 9 pgs., doi: 10.48550/arXiv.1312.5602.
Nachum et al., "DualDICE: Behavior-Agnostic Estimation of Discounted Stationary Distribution Corrections", Thirty-third Conference on Neural Information Processing Systems, Nov. 4, 2019, 23 pgs., doi: 10.48550/arXiv.1906.04733.
Ng et al., "Algorithms for inverse reinforcement learning", International conference on Machine learning (ICML), 2000, 8 pgs.
Piot et al., "Boosted and Reward-regularized Classification for Apprenticeship Learning", International conference on Autonomous agents and multi-agent systems (AAMAS), May 2014, 8 pgs.
Raffin et al., "RL Baselines3 Zoo: A Training Framework for Stable Baselines3 Reinforcement Learning Agents", Rl baselines3 zoo, accessed 2020, https://github.com/DLR-RM/rl-baselines3-zoo, 2020, 9 pgs.
Reddy et al., "SQIL: Imitation Learning via Reinforcement Learning with Sparse Rewards", UC Berkeley, Sep. 25, 2019, 14 pgs., doi: 10.48550/arXiv.1905.11108.
Ross et al., "Efficient Reductions for Imitation Learning", International conference on artificial intelligence and statistics (AISTATS), 2010, 8 pgs.
Sammut et al., "Learning to Fly", Proceedings of the Ninth Conference on Machine Learning, 1992, pp. 385-393.
Sion M., "On general minimax theorems", Pacific Journal of Mathematics, Mar. 1, 1958, 9 pgs., doi: 10.2140/PJM. 1958.8.171.
Swamy et al., "Of moments and matching: Trade-offs and treatments in imitation learning", arXiv:2103.03236v1 [cs.LG], Mar. 4, 2021, 17 pgs.
Wang et al., "Adversarial Cooperative Imitation Learning for Dynamic Treatment Regimes", Proceedings of the Web Conference 2020, 2020, pp. 1785-1795, doi:10.1145/3366423.3380248.
Zhou et al., "Exploring Imitation Learning for Autonomous Driving with Feedback Synthesizer and Differentiable Rasterization", 2021 IEEE RSJ.
International Conference on Intelligent Robots and Systems (IROS), Aug. 3, 2021, 8 pgs., doi: 10.48550/arXiv.2103.01882.
Ziebart et al., "Maximum Entropy Inverse Reinforcement Learning", Twenty-Third AAAI Conference on Artificial Intelligence, 2008, 6 pgs.
Ziebart, "Modeling Purposeful Adaptive Behavior with the Principle of Maximum Causal Entropy", Carnegie Mellon University, 2010, 236 pgs., doi:10.1184/R1/6720692.V1.

* cited by examiner

SYSTEMS AND METHODS FOR IMITATION LEARNING

CROSS-REFERENCE TO RELATED APPLICATIONS

The current application claims the benefit of and priority under 35 U.S.C. § 119(e) to U.S. Provisional Patent Application No. 63/221,894 entitled "Systems and Methods for Inverse soft-Q Learning for Imitation" filed Jul. 14, 2021. The disclosure of U.S. Provisional Patent Application No. 63/221,894 is hereby incorporated by reference in its entirety for all purposes.

STATEMENT OF FEDERAL SUPPORT

This invention was made with Government support under contract FA9550-19-1-0024 awarded by the Air Force Office of Scientific Research, under contract 1651565 awarded by the National Science Foundation, under contract 1522054 awarded by the National Science Foundation, under contract 173 awarded by the National Science Foundation, and under contract N00014-19-1-2145 awarded by the Office of Naval Research. The Government has certain rights in the invention.

FIELD OF THE INVENTION

The present invention generally relates to computational learning based on imitation.

BACKGROUND

Imitation learning (sometimes referred to as "apprenticeship learning") refers to an artificial intelligence (AI) process of learning by observing an expert agent. Behavioral cloning is a method by which expert agent skills can be captured and reproduced in a program by recording the expert agent's actions along with the situation that gave rise to those actions. The records can then be used as inputs to a learning model.

SUMMARY OF THE INVENTION

Systems and methods for imitation learning in accordance with embodiments of the invention are illustrated. One embodiment includes a method for imitation learning. The method includes steps for initializing a Q-function, training the Q-function using a non-adversarial objective based on a set of one or more expert trajectories, and determining a policy based on the trained Q-function.

In a further embodiment, training the Q-function is performed with gradient descent to convergence.

In still another embodiment, training the Q-function includes sampling from the expert distribution.

In a still further embodiment, training the Q-function further includes sampling from a replay buffer.

In yet another embodiment, determining the policy includes computing the policy based on $$\pi := \frac{1}{Z}\exp Q_\theta.$$

In a yet further embodiment, the non-adversarial objective is computed in a γ-discounted infinite horizon setting.

In another additional embodiment, training the Q-function is further based on a set of input rewards.

In a further additional embodiment, the non-adversarial objective does not rely on a reward as input.

In another embodiment again, the method further includes steps for using the determined policy to drive an artificial intelligence (AI) bot.

In a further embodiment again, the AI bot is at least one selected from the group consisting of a conversational agent and a video game agent.

In still yet another embodiment, the method further includes steps for determining a reward based on the trained Q-function.

In a still yet further embodiment, the reward is determined based on $$r(s, a, s') = Q(s, a) - \gamma V^{\pi}(s').$$

One embodiment includes a system utilizing an imitation learning model to control operation, comprising a processor, and a memory, where the memory contains a control application capable of directing the processor to control the operation of an output device by obtaining current state information of the output device, providing the current state information to an imitation learning model, obtaining control data from the imitation learning model based on the determined policy, and controlling the output device using the control data. The imitation learning model uses a single Q-function, and the imitation learning model is trained by initializing a Q-function, training the Q-function using a non-adversarial objective based on a set of one or more expert trajectories, and determining a policy based on the trained Q-function.

In still another additional embodiment, the output device is at least one selected from the group consisting of a medical device, a video game device, a robot, and an autonomous vehicle.

In a still further additional embodiment, training the Q-function is performed with gradient descent to convergence.

In still another embodiment again, training the Q-function includes sampling from the expert distribution and sampling from a replay buffer, wherein the replay buffer includes the current state information.

In a still further embodiment again, determining the policy includes computing the policy based on $$\pi := \frac{1}{Z}\exp Q_\theta.$$

In yet another additional embodiment, training the Q-function is further based on a set of input rewards.

In a yet further additional embodiment, the method further includes steps for determining a reward based on the trained Q-function, wherein the reward is determined based on $$r(s, a, s') = Q(s, a) - \gamma V^{\pi}(s').$$

One embodiment includes a non-transitory machine readable medium containing processor instructions for imitation learning, where execution of the instructions by a processor causes the processor to perform a process that comprises initializing a Q-function, training the Q-function using a non-adversarial objective based on a set of one or more expert trajectories, and determining a policy based on the trained Q-function, and determining a reward based on the trained Q-function.

One embodiment includes a method for imitation learning. The method includes steps for initializing a policy and a single Q-function, training the Q-function and the policy by iteratively optimizing the Q-function using a non-adversarial objective based on a set of one or more expert trajectories, improving the policy with an actor update based on the Q-function, and determining a reward based on the trained Q-function.

In yet another embodiment again, the method further includes steps for learning a new policy based on the determined reward.

In a yet further embodiment again, training the Q-function is performed using a soft actor-critic (SAC) update.

In another additional embodiment again, training the Q-function includes sampling from the expert distribution.

In a further additional embodiment again, training the Q-function further includes sampling from a replay buffer.

In still yet another additional embodiment, the non-adversarial objective is computed in a γ-discounted infinite horizon setting.

In a further embodiment, training the Q-function is further based on a set of input rewards.

In still another embodiment, the non-adversarial objective does not rely on a reward as input.

In a still further embodiment, the method further includes steps for using the determined policy to drive an artificial intelligence (AI) bot.

In yet another embodiment, the AI bot is at least one selected from the group consisting of a conversational agent and a video game agent.

In a yet further embodiment, the method further includes steps for evaluating an AI agent based on the determined rewards.

One embodiment includes a system utilizing an imitation learning model to control operation, comprising a processor, and a memory, where the memory contains a control application capable of directing the processor to control the operation of an output device by obtaining current state information of the output device, providing the current state information to an imitation learning model, obtaining control data from the imitation learning model based on the determined policy, and controlling the output device using the control data. The imitation learning model uses a single Q-function, and the imitation learning model is trained by initializing a policy and a single Q-function, training the Q-function and the policy by iteratively optimizing the Q-function using a non-adversarial objective based on a set of one or more expert trajectories, improving the policy with an actor update based on the Q-function, and determining a reward based on the trained Q-function, In another additional embodiment, the output device is at least one selected from the group consisting of a medical device, a video game device, a robot, and an autonomous vehicle.

In a further additional embodiment, the method further includes steps for learning a new policy based on the determined reward.

In another embodiment again, training the Q-function is performed using a soft actor-critic (SAC) update.

In a further embodiment again, training the Q-function comprises sampling from the expert distribution, and sampling from a replay buffer.

In still yet another embodiment, training the Q-function is further based on a set of input rewards.

In a still yet further embodiment, the method further includes steps for using the determined policy to drive an artificial intelligence (AI) bot.

In still another additional embodiment, the method further includes steps for evaluating an AI agent based on the determined rewards.

One embodiment includes a non-transitory machine readable medium containing processor instructions for imitation learning, where execution of the instructions by a processor causes the processor to perform a process that comprises initializing a policy and a single Q-function, training the Q-function and the policy by iteratively optimizing the Q-function using a non-adversarial objective based on a set of one or more expert trajectories, and improving the policy with an actor update based on the Q-function, and determining a reward based on the trained Q-function.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
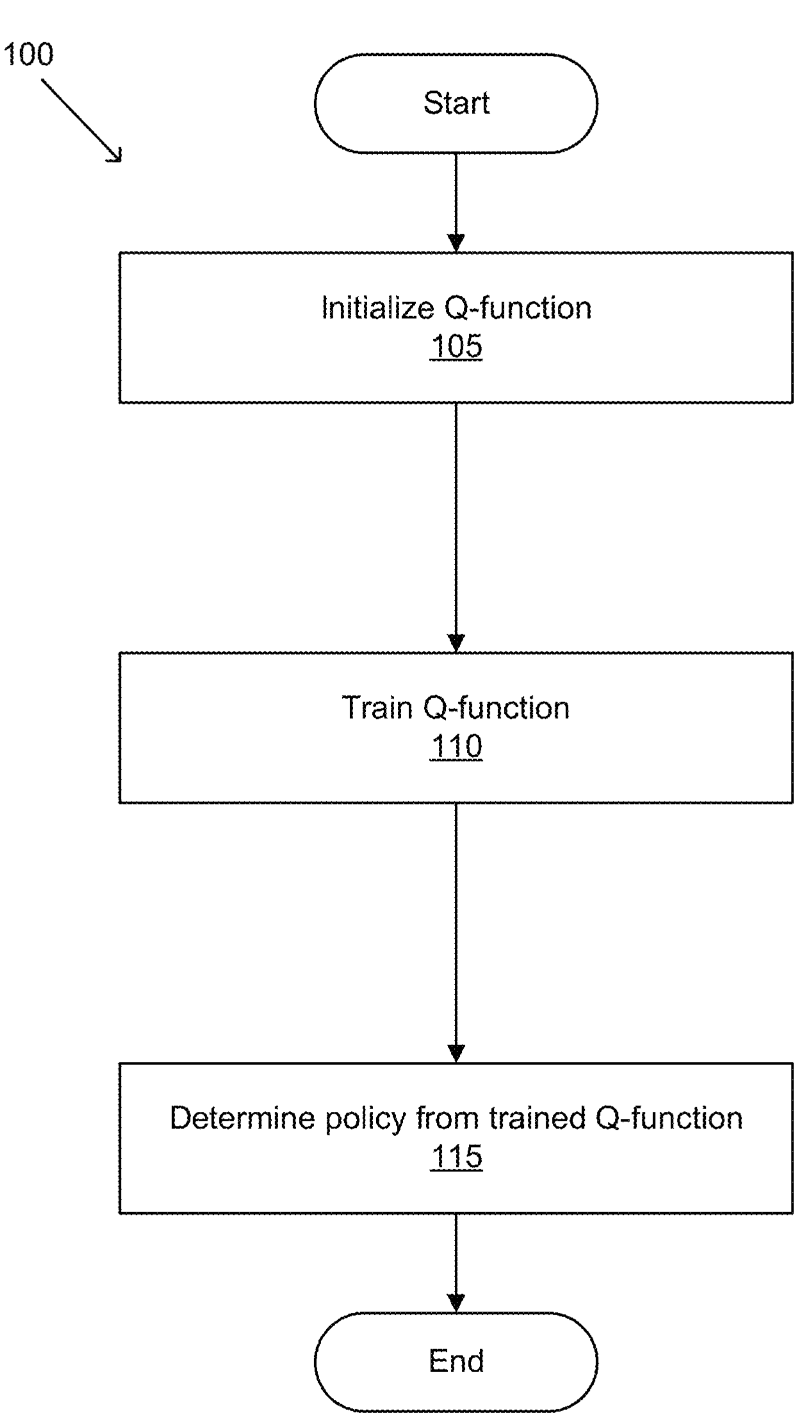
FIG. 1 conceptually illustrates an example of imitation learning with a Q-learning process in accordance with an embodiment of the invention.

Imitation of an expert has long been recognized as a powerful approach for sequential decision-making, with applications as diverse as healthcare, autonomous driving, and playing complex strategic games. However, conventional imitation learning methodologies often utilize behavioral cloning, which is beneficial for its simplicity to implement and its stable convergence, but fails to utilize any information involving an environment's dynamics. Conventional methods that do exploit dynamics information tend to be difficult to train in practice due to an adversarial optimization process over reward and policy approximators, or biased, high variance gradient estimators.

In order to address these deficiencies, systems and methods in accordance with various embodiments of the invention provide dynamics-aware imitation learning which avoids adversarial training by learning a single Q-function. Dynamics-aware imitation learning in accordance with a variety of embodiments of the invention may more convincingly master the environment and can more reliably find optimal policies, even for situations that have not been explored by any of the expert trajectories. In many embodiments, the single Q-function implicitly represents both reward and policy. Systems and methods in accordance with a number of embodiments of the invention introduce a simple framework to minimize a wide range of statistical distances (e.g., Integral Probability Metrics (IPMs) and f-divergences) between the expert and learned distributions. Dynamics Inverse Q-learning in accordance with a number of embodiments of the invention strongly outperforms many existing methods on a diverse collection of RL tasks and environments—ranging from low-dimensional control tasks: CartPole, Acrobot, LunarLander—to more challenging continuous control MuJoCo tasks: HalfCheetah, Hopper, Walker, Ant, and even the visually challenging Atari Suite with high-dimensional image inputs. In some cases, inverse Q-learning was able to reach expert performance using only a single expert trajectory and was also shown to converge more quickly than many existing methods.

On standard benchmarks, the implicitly learned rewards show a high positive correlation with the ground-truth rewards. Systems and methods in accordance with various embodiments of the invention (also referred to as Inverse soft-Q learning (IQ-Learn) herein) can be used for inverse reinforcement learning (IRL). IQ-Learn implementations can obtain state-of-the-art results in both offline and online imitation learning settings, and in various applications can surpass existing methods both in the number of required environment interactions and scalability in high-dimensional spaces.

In the imitation learning (IL) setting, a set of expert trajectories are given with the goal of learning a policy which induces behavior similar to the expert's. The learner has no access to the reward, and no explicit knowledge of the dynamics. A simple behavioural cloning approach simply maximizes the probability of the expert's actions under the learned policy, approaching the IL problem as a supervised learning problem. While this can work well in simple environments and with large quantities of data, it ignores the sequential nature of the decision-making problem, and small errors can quickly compound when the learned policy departs from the states observed under the expert.

A natural way of introducing environment dynamics is by framing the IL problem as an Inverse RL (IRL) problem, aiming to learn a reward function under which the expert's trajectory is optimal, and from which the learned imitation policy can be trained. This framing has inspired several approaches which use rewards either explicitly or implicitly to incorporate dynamics while learning an imitation policy. However, these dynamics-aware methods are typically hard to put into practice due to unstable learning which can be sensitive to hyperparameter choice or minor implementation details.

Much of the difficulty with previous IL methods arises from the IRL-motivated representation of the IL problem as a min-max problem over reward and policy. This introduces a requirement to separately model the reward and policy, and train these two functions jointly, often in an adversarial fashion. Drawing on connections between RL and energy-based models, systems and methods in accordance with some embodiments of the invention learn a single model for the Q-value. The Q-value then implicitly defines both a reward and policy function. This turns a difficult min-max problem over policy and reward functions into a simpler minimization problem over a single function, the Q-value. The minimization problem over the Q-value has a one-to-one correspondence with the min-max problem studied in adversarial IL, maintaining the generality and guarantees of these previous approaches, resulting in a meaningful reward that may be used for inverse reinforcement learning. In several embodiments, processes may minimize a variety of statistical divergences between the expert and learned policy.

Systems and methods in accordance with various embodiments of the invention are performant even with very sparse data—surpassing prior methods using one expert demonstration in the completely offline setting—and can scale to complex image-based tasks (like Atari) reaching expert performance. Moreover, learned rewards are highly predictive of the original environment rewards.

A. Inverse soft Q-learning (IQ-Learn)

Consider environments represented as a Markov decision process (MDP), which is defined by a tuple $(\mathcal{S}, \mathcal{A}, p_0, \mathcal{P}, r, \gamma)$. $\mathcal{S}, \mathcal{A}$, represent state and action spaces, $p_0$ and $\mathcal{P}(s'|s,a)$ represent the initial state distribution and the dynamics, r(s,a) represents the reward function, and $\gamma \in (0,1)$ represents the discount factor. $\mathbb{R}^{\mathcal{S}\times\mathcal{A}} = \{x: \mathcal{S}\times\mathcal{A} \rightarrow \mathbb{R}\}$ will denote the set of all functions in the state-action space and $\overline{\mathbb{R}}$ will denote the extended real numbers $\mathbb{R} \cup \{\infty\}$. Systems and methods in accordance with many embodiments of the invention may work with finite state and action spaces S and A and/or with continuous environments. $\Pi$ is the set of all stationary stochastic policies that take actions in A given states in S. Many of the examples herein are described in the $\gamma$-discounted infinite horizon setting and use an expectation with respect to a policy $\pi \in \Pi$ to denote an expectation with respect to the trajectory it generates:

$$\mathbb{E}_\pi[r(s,a)] \triangleq \mathbb{E}\left[\sum_{t=0}^{\infty} \gamma^t r(s_t, a_t)\right], \text{ where } s_0 \sim p_0, \quad a_t \sim \pi(\cdot|s_t), \text{ and } s_{t+1} \sim \mathcal{P}(\cdot|s_t, a_t) \text{ for } t \geq 0.$$

For a policy $\pi \in \Pi$ its occupancy measure $\rho_\pi: \mathcal{S}\times\mathcal{A} \rightarrow \mathbb{R}$ can be defined as $$\rho_\pi(s,a) = \pi(a|s) \sum_{t=0}^{\infty} \gamma^t P(s_t = s|\pi),$$

the expert policy as $\pi_E$ and its occupancy measure as $\rho_E$. In practice, $\pi_E$ may be unknown and is rather approximated from a sampled dataset of demonstrations. For brevity, $\rho_\pi$ may be referred to as $\rho$ for a learnt policy in this description. Although many of the examples are described in the $\gamma$-discounted infinite horizon setting, one skilled in the art will recognize that similar systems and methods can be used in other types of discounted settings or in undiscounted settings, without departing from this invention.

For a reward $r \in \mathbb{R}^{\mathcal{S}\times\mathcal{A}}$ and $\pi \in \Pi$, the soft Bellman operator $\mathcal{B}^\pi: \mathbb{R}^{\mathcal{S}\times\mathcal{A}}\ \mathbb{R}^{\mathcal{S}\times\mathcal{A}}$ defined as $$(\mathcal{B}^\pi Q)(s, a) = r(s, a) + \gamma \mathbb{E}_{s' \sim P(s,a)} V^\pi(s') \text{ with } V^\pi(s) = \mathbb{E}_{a \sim \pi(\cdot|s)}[Q(s, a) - \log \pi(a|s)].$$

The soft Bellman operator is contractive and defines a unique soft Q-function for r, given as $$Q = \mathcal{B}^\pi Q.$$

For a given reward function $r \in \mathbb{R}^{\mathcal{S}\times\mathcal{A}}$, maximum entropy RL aims to learn a policy that maximizes the expected cumulative discounted reward along with the entropy in each state:

$$\max_{\pi \in \prod} \mathbb{E}_\pi[r(s, a)] + H(\pi).$$

Where $$H(\pi) \triangleq \mathbb{E}_\pi[-\log \pi(a|s)]$$

is the discounted causal entropy of the policy $\pi$. The optimal policy satisfies:

$$\pi^*(a \mid s) = \frac{1}{Z_s}\exp(Q(s, a)), \tag{1}$$

where Q is the soft Q-function and $Z_s$ is the normalization factor given as $$\sum_{a'} \exp(Q(s, a')).$$

Q satisfies the soft-Bellman equation:

$$Q(s, a) = r(s, a) + \gamma \mathbb{E}_{s' \sim \mathcal{P}(\cdot|s,a)}\left[\log \sum_{a'} \exp(Q(s', a'))\right] \tag{2}$$

In continuous action spaces, $Z_s$, becomes intractable and soft actor-critic (SAC) methods can be used to learn an explicit policy.

Given demonstrations sampled using the policy $\pi_E$, maximum entropy Inverse RL aims to recover the reward function in a family of functions $\mathcal{R}$ that rationalizes the expert behavior by solving the optimization problem:

$$\max_{r \in R} \min_{\pi \in \prod} \mathbb{E}_{\pi_E}[r(s, a)] - (\mathbb{E}_\pi[r(s, a)] + H(\pi)),$$

where the expected reward of $\pi_E$ is empirically approximated. It looks for a reward function that assigns high reward to the expert policy and a low reward to other policies, while searching for the best policy for the reward function in an inner loop.

The Inverse RL objective can be reformulated in terms of its occupancy measure, and with a convex reward regularizer $\psi: \mathbb{R}^{\mathcal{S}\times\mathcal{A}} \to \overline{\mathbb{R}}$ $$\max_{r \in \mathcal{R}} \min_{\pi \in \Pi} L(\pi, r) = \mathbb{E}_{\rho_E}[r(s, a)] - \mathbb{E}_\rho[r(s, a)] - H(\pi) - \psi(r) \tag{3}$$

In general, the max-min can be exchanged, resulting in an objective that minimizes the statistical distance parameterized by $\psi$, between the expert and the policy $$\min_{\pi \in \Pi} \max_{r \in \mathcal{R}} L(\pi, r) = \min_{\pi \in \Pi} d_\psi(\rho, \rho_E) - H(\pi), \tag{4}$$

with $$d_\psi \triangleq \psi^*(\rho_E - \rho),$$

where $\psi^*$ is the convex conjugate of $\psi$.

A naive solution to the IRL problem in (Eq. 3) involves (1) an outer loop learning rewards and (2) executing RL in an inner loop to find an optimal policy for them. However, processes in accordance with a number of embodiments of the invention can obtain this optimal policy analytically in terms of soft Q-functions (Eq. 1). The rewards can also be represented in terms of Q (Eq. 2). In numerous embodiments, the IRL problem can be solved by optimizing only over the Q-function.

To motivate the search of an imitation learning algorithm that depends only on the Q-function, the space of Q-functions and policies obtained can be characterized using Inverse RL, with $\pi \in \Pi$, $r \in \mathcal{R}$ and Q-functions $Q \in \Omega$ where $\mathcal{R} = \Omega = \mathbb{R}^{\mathcal{S}\times\mathcal{A}}$. Assume $\Pi$ is convex, compact and that $\pi_E \in \Pi$. Define $$V^\pi(s) = \mathbb{E}_{a \sim \pi(\cdot|s)}[Q(s, a) - \log\pi(a|s)].$$

The regularized IRL objective $L(\pi,r)$ given by Eq. 3, is concave in the policy and convex in rewards and has a unique saddle point where it is optimized.

To characterize the Q-functions, it can be useful to transform the optimization problem over rewards to a problem over Q-functions. To get a one-to-one correspondence between r and Q:

Define the inverse soft bellman operator $\mathcal{T}^\pi: \mathbb{R}^{\mathcal{S}\times\mathcal{A}} \to \mathbb{R}^{\mathcal{S}\times\mathcal{A}}$ such that $$(\mathcal{T}^\pi Q)(s, a) = Q(s, a) - \gamma \mathbb{E}_{s' \sim P(s,a)} V^\pi(s'),$$

The inverse soft bellman operator $\mathcal{T}^\pi$ is bijective, and $$(\mathcal{T}^\pi)^{-1} = \mathcal{B}^\pi.$$

For a policy π, rewards can be interchanged with corresponding soft-Q functions in accordance with various embodiments of the invention. Functions can be freely transformed from the reward-policy space: $\Pi\times\mathcal{R}$ to the Q-policy space: Π×Ω, so that:

$$\text{If } L(\pi, r) = \mathbb{E}_{\rho_E}[r(s, a)] - \mathbb{E}_{\rho}[r(s, a)] - H(\pi) - \psi(r) \text{ and}$$

$$\mathcal{J}(\pi, Q) = \mathbb{E}_{\rho_E}[(\mathcal{T}^\pi Q)(s, a)] - \mathbb{E}_{\rho}[(\mathcal{T}^\pi Q)(s, a)] - H(\pi) - \psi(\mathcal{T}^\pi Q),$$

then for all policies $$\pi \in \prod, L(\pi, r) = \mathcal{J}\left(\pi, (\mathcal{T}^\pi)^{-1} r\right)$$

for all $r\in\mathcal{R}$, and $$\mathcal{J}(\pi, Q) = L(\pi, \mathcal{T}^\pi Q),$$

for all Q∈Ω. Thus, the Inverse RL objective L(π,r) can be adapted to learn Q through $\mathcal{J}$(π,Q).

Simplifying the new objective:

$$\mathcal{J}(\pi, Q) = \mathbb{E}_{s,a\sim\rho_E}\left[Q - \gamma\mathbb{E}_{s'\sim\mathcal{P}(\cdot|s,a)}V^\pi(s')\right] - (1-\gamma)\mathbb{E}_{s_0\sim p_0}[V^\pi(s_0)] - \psi(\mathcal{T}^\pi Q), \tag{5}$$

The Inverse RL optimization problem $\mathcal{J}$(π,Q) can be studied in the Q-policy space. As the regularizer ψ depends on both Q and π, a general analysis over all functions in $\mathbb{R}^{\mathcal{S}\times\mathcal{A}}$ becomes too difficult. In various embodiments, processes may be restricted to regularizers induced by a convex function $g:\mathbb{R}\rightarrow\overline{\mathbb{R}}$ such that $$\psi_g(r) = \mathbb{E}_{\rho_E}[g(r(s, a))] \tag{6}$$

This allows the analysis to be simplified to the set of all real functions while retaining generality.

In the Q-policy space, there exists a unique saddle point (π*,Q*) that optimizes $\mathcal{J}$. i.e.

$$Q^* = \text{argmax}_{Q\in\Omega}\min_{\pi\in\Pi}\mathcal{J}(\pi, Q) \text{ and } \pi^* = \text{argmin}_{\pi\in\Pi}\max_{Q\in\Omega}\mathcal{J}(\pi, Q).$$

Furthermore, π* and $$r^* = T^{\pi^*}Q^*$$

are the solution to the Inverse RL objective L(π,r). Thus, $$\max_{Q\in\Omega}\min_{\pi\in\Pi}\mathcal{J}(\pi, Q) = \max_{r\in\mathcal{R}}\min_{\pi\in\Pi}L(\pi, r).$$

Even after transforming to Q-functions, the saddle point property of the original IRL objective is retained and optimizing $\mathcal{J}$(π,Q) recovers this saddle point. In the Q-policy space, for a fixed Q, $\text{argmin}_{\pi\in\Pi}\mathcal{J}(\pi,Q)$ is the solution to max entropy RL with rewards $r=\mathcal{T}^\pi Q$. Thus, this forms a manifold in the Q-policy space, that satisfies $$\pi_Q(a \mid s) = \frac{1}{Z_s}\exp(Q(s, a)),$$

with normalization factor $Z_s=\Sigma_a \exp Q(s,a)$ and $\pi_Q$ defined as the π corresponding to Q.

Thus, if Q is known, then the inner optimization problem in terms of policy is trivial, and obtained in a closed form, giving an objective that only requires learning Q:

$$\max_{Q\in\Omega}\min_{\pi\in\Pi}\mathcal{J}(\pi, Q) = \max_{Q\in\Omega}\mathcal{J}(\pi_Q, Q) \tag{7}$$

Furthermore, let $\mathcal{J}^*(Q)=\mathcal{J}(\pi_Q,Q)$. Then $\mathcal{J}^*$ is concave in Q. This new optimization objective is well-behaved and is maximized only at the saddle point.

In a number of embodiments, imitation processes can use different regularizers ψ, where different statistical distances correspond to different saddle points. The overall effect may be that the saddle point π* remains close to the expert policy $\pi_E$, but may not be exactly equal as the regularization constrains the policy class.

For IRL objectives in accordance with numerous embodiments of the invention, there exists an optimal policy manifold depending on Q, allowing optimization along it (using $\mathcal{J}^*$) to converge to a saddle point. Although the same analysis holds in the reward-policy space, the optimal policy manifold depends on Q, which isn't trivially known unlike when in the Q-policy space.

Imitation learning processes in accordance with many embodiments of the invention can incorporate a choice of reward function. In a number of embodiments, rewards may include (but are not limited to) a reward from the environment or a sparse performance measure indicating success of an agent in completing a task. As an example, the system can learn a reward given as:

$$r = r' + x = Q(s, a) - \gamma E_{s'\sim P(s,a)}V^\pi(s')$$

where r' is a pre-specified reward component given to the imitation process and x is the learnt reward component.

B. Approach

Systems and methods in accordance with some embodiments of the invention can recover an optimal soft Q-function for a MDP from a given expert distribution. Processes in accordance with a number of embodiments of the invention can learn policies by learning energy-based models for the policy similar to soft Q-learning. In some embodiments, explicit policies can be learned, similar to actor-critic methods. In a number of embodiments, pre-specified rewards can be given to learn soft Q-functions.

Using regularizers of the form $p_9$ (from Eq. 6), define g using a concave function $\phi:\mathcal{R}_\psi\rightarrow\mathbb{R}$, such that $$g(x) = \begin{cases} x - \phi(x) & \text{if } x \in \mathcal{R}_\psi \\ +\infty & \text{otherwise} \end{cases}$$

with the rewards constrained in $R_\psi$. For this choice of ψ, the Inverse RL objective L(π,r) takes the form of Eq. 4 with a distance measure:

$$d_\psi(\rho, \rho_E) = \max_{r \in \mathcal{R}_\psi} \mathbb{E}_{\rho_E}[\phi(r(s, a))] - \mathbb{E}_\rho[r(s, a)], \quad (8)$$

This forms a general learning objective that allows the use of a wide-range of statistical distances including (but not limited to) Integral Probability Metrics (IPMs) (e.g., Dudley metric, Wasserstein metric, total variation distance, Maximum Mean Discrepancy (MMD), etc.) and f-divergences (e.g., forward Kullback-Leibler (KL), reverse KL, squared Hellinger, Pearson, total variation, Jensen-Shannon, etc.).

While choosing a practical regularizer, it can be useful to obtain certain properties on the reward functions to be recovered. Some (natural) nice properties are: having rewards bounded in a range, learning smooth functions or enforcing a norm-penalty. These properties correspond to the Total Variation distance, the Wasserstein-1 distance and the $\chi^2$-divergence respectively. The regularizers and the induced statistical distances are summarized in the table below. This table illustrates the enforced reward property, corresponding regularizer ψ and statistical distance ($R_{max}$, K,α∈ $\mathbb{R}^+$).

| Reward Property | ψ | $d_\psi$ |
|---|---|---|
| Bound range | ψ = 0 if \|r\| ≤ $R_{max}$ and + ∞ otherwise | $2R_{max}$ · TV(ρ, $\rho_E$) |
| Smoothness | ψ = 0 if $r_{Lip}$ ≤ K and + ∞ otherwise | K · $W_1$(ρ, $\rho_E$) |
| L2 Penalization | ψ(r) = $\alpha r^2$ | $\frac{1}{4\alpha} \cdot \chi^2(\rho, \rho_E)$ |

In several embodiments, processes can learn in a discrete action environment. Optimization along the optimal policy manifold gives the concave objective:

$$\max_{Q \in \Omega} \mathcal{J}^*(Q) = \mathbb{E}_{\rho_E}\left[\phi\left(Q(s, a) - \gamma \mathbb{E}_{s' \sim \mathcal{P}(\cdot|s,a)} V^*(s')\right)\right] - (1-\gamma)\mathbb{E}_{\rho_0}[V^*(s_0)], \quad (9)$$

with $$V^*(s) = \log \sum_a \exp Q(s, a).$$

For each Q, corresponding reward $$r(s, a) = Q(s, a) - \gamma \mathbb{E}_{s' \sim \mathcal{P}(\cdot|s,a)}\left[\log \sum_{a'} \exp Q(s', a')\right].$$

This correspondence is unique, and every update step can be seen as finding a better reward for IRL. Estimating V*(s) exactly may only be possible in discrete action spaces. Such objectives in accordance with various embodiments of the invention can form a variant of soft-Q learning: to learn the optimal Q-function given an expert distribution.

In continuous action spaces, it might not be possible to exactly obtain the optimal policy $\pi_Q$, which forms an energy-based model of the Q-function. In some embodiments, an explicit policy π can be used to approximate $\pi_Q$.

For any policy π, an objective (from Eq. 5):

$$\mathcal{J}(\pi, Q) = \mathbb{E}_{\rho_E}\left[\phi\left(Q - \gamma \mathbb{E}_{s' \sim \mathcal{P}(\cdot|s,a)} V^\pi(s')\right)\right] - (1-\gamma)\mathbb{E}_{\rho_0}[V^\pi(s_0)] \quad (10)$$

For a fixed Q, a soft actor-critic (SAC) update:

$$\min_\pi \mathbb{E}_{s \sim \mathcal{D}, a \sim \pi(\cdot|S)}[Q(s, a) - \log \pi(a \mid s)],$$

brings π closer to $\pi_Q$ while always minimizing Eq. 10. Here $\mathcal{D}$ is the distribution of previously sampled states, or a replay buffer.

In numerous embodiments, processes can learn Q-functions from the expert distribution by iteratively:

1. For a fixed π, optimizing Q by maximizing $\mathcal{J}$ (π,Q).
2. For a fixed Q, applying SAC update to optimize π towards $\pi_Q$.

This differs from ValueDICE, where the actor is updated adverserially and the objective may not always converge.

C. Process

Processes for imitation learning are described below with reference to FIGS. 1 and 2. An example of imitation learning with a Q-learning process in accordance with an embodiment of the invention is conceptually illustrated in FIG. 1. Process 100 initializes (105) Q-function $Q_\theta$. Initializing $Q_\theta$ in accordance with a variety of embodiments of the invention can include (but is not limited to) training $Q_\theta$ from scratch, using a pre-trained model, using a set of partial or complete sets of expert trajectories, etc.

Expert trajectories in accordance with a number of embodiments of the invention can include trajectories obtained from one or multiple different sources. In a variety of embodiments, expert trajectories may include optimal and/or non-optimal behavior. In various embodiments, expert trajectories can include (partial) expert states without expert actions, such as (but not limited to) in the form of videos.

Process 100 trains (110) the Q-function using a non-adversarial objective. Examples of non-adversarial objectives are described above and illustrated in Eqs. 9 and 10. Process 100 determines (115) a policy from the trained Q-function. In numerous embodiments, processes can determine a policy from a trained Q-function as $$\pi := \frac{1}{Z} \exp Q_\theta.$$

Figure 2:
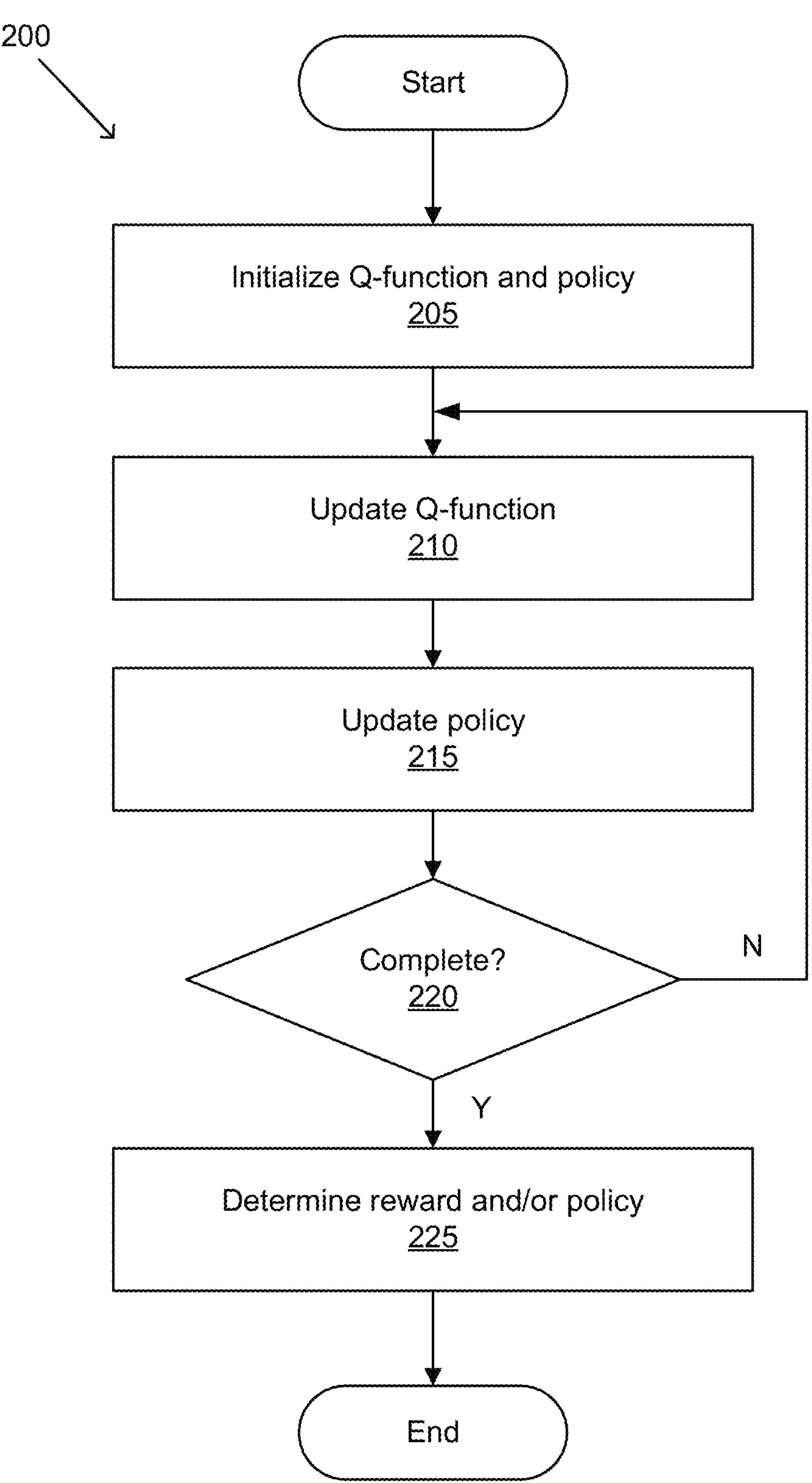
FIG. 2 conceptually illustrates an example of imitation learning for continuous environments in accordance with an embodiment of the invention.

An example of imitation learning for continuous environments in accordance with an embodiment of the invention is conceptually illustrated in FIG. 2. Process 200 initializes (205) a Q-function and a policy. Q-functions and/or policies can be initialized in various ways, such as (but not limited to) training $Q_\theta$ from scratch, using a pre-trained model, using a set of partial or complete sets of expert trajectories, etc.

Process 200 then interatively trains the Q-function and policy. Process 200 updates (210) the Q-function based on the policy. Process 200 updates (215) the policy based on the updated Q-function. Processes in accordance with various embodiments of the invention can perform updates to a Q-function and policy using actor-critic methods.

Process 200 determines (220) whether the training is complete. Training in accordance with a variety of embodiments of the invention may be determined to be complete based on various factors, such as (but not limited to) after a fixed number of iterations, once the Q-function and/or policy have converged, etc. When process 200 determines (220) that the training is not complete, the process returns to step 210.

When process 200 determines (220) that the training is complete, the process determines (225) a reward and/or policy. In various embodiments, the determined policy is the policy trained using this process. Processes in accordance with many embodiments of the invention can use the trained Q-function to determine a reward model. Processes in accordance with many embodiments of the invention can use reward models in a reinforcement learning process to learn a new policy.

Rewards in accordance with some embodiments of the invention can be used to provide interpretability for a trained policy, making them more reliable and trustable. In a variety of embodiments, rewards can be used to score or evaluate policies and/or AI agents. In certain embodiments, prior rewards can be incorporated to update the Q-function.

While specific processes for imitation learning are described above, any of a variety of processes can be utilized to learn via imitation as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

In numerous embodiments, Q-functions can be trained by optimizing $$\max_{Q\in\Omega} \mathcal{J}^*(Q) = \mathbb{E}_{\rho_E}\left[\phi\left(Q(s,a) - \gamma\mathbb{E}_{s'\sim\mathcal{P}(\cdot|s,a)}V^*(s')\right)\right] - (1-\gamma)\mathbb{E}_{\rho_0}[V^*(s_0)].$$

In numerous embodiments, training can include using gradient descent to optimize the non-adversarial objective. In several embodiments, V* an be used for discrete action environments and $$V^{\pi_\phi}$$

can be used for continuous environments. In several embodiments, processes can update policy $\pi_\phi$ based on the updated Q-function. Policy updates in accordance with certain embodiments of the invention can include SAC style actor updates:

$$\phi_{t+1} \leftarrow \phi_t - \alpha_\pi \nabla_\phi \mathbb{E}_{s\sim\mathcal{D},a\sim\pi_\phi(\cdot|s)}[Q(s,a) - \log\pi_\phi(a|s)]$$

Although many of the examples described herein SAC style actor updates, one skilled in the art will recognize that similar systems and methods can be used with various actors, including (but not limited to) updates from Proximal Policy Optimization (PPO) and Decision Transformers, without departing from this invention.

In various embodiments, once a Q-function has been trained, processes can recover a policy and/or reward.

$$(Q\text{-learning})\ \pi := \frac{1}{Z}\exp Q_\theta$$

$$(\text{actor-critic})\ \pi := \pi_\phi$$

For state s, action a and $$s' \sim \mathcal{P}(\cdot|s,a)$$

Recover reward $$r(s,a,s') = Q_\theta(s,a) - \gamma V^\pi(s')$$

It can be shown that $$\mathbb{E}_{(s,a)\sim\mu}\left[V^\pi(s) - \gamma\mathbb{E}_{s'\sim\mathcal{P}(\cdot|s,a)}V^\pi(s')\right] = (1-\gamma)E_{s\sim p_0}[V^\pi(s)],$$

where μ is any policy's occupancy. In many embodiments, this can be used to stabilize training instead of using Eq. 9 directly.

Imitation learning in accordance with a variety of embodiments of the invention can learn in online and/or offline modes. For online learning, instead of directly estimating $$E_{p_0}[V^\pi(s_0)],$$

processes in accordance with several embodiments of the invention can sample (s,a,s') from a replay buffer and get a single-sample estimate $$E_{(s,a,s')\sim replay}[V^\pi(s) - \gamma V^\pi(s')].$$

This removes the issue where Q is only optimized in the initial states resulting in overfitting of $V^\pi(s_0)$, and improves the stability for convergence. In several embodiments, processes sample from the policy buffer and from the expert distribution. Processes in accordance with some embodiments of the invention may sample equally from the policy buffer and from the expert distribution.

Although $$\mathbb{E}_{p_0}[V^\pi(s_0)]$$

can be estimated offline, an overfitting issue may still be observed. In certain embodiments, instead of requiring policy samples, only expert samples may be used to estimate $$\mathbb{E}_{(s,a,s')\sim expert}[V^\pi(s) - \gamma V^\pi(s')]$$

to sufficiently approximate the term. Such sampling has been shown to provide state-of-art results for offline IL.

In several embodiments, once Q-functions have been trained (or learned), processes can recover rewards from the trained Q-functions. Instead of the conventional reward function r(s,a) on state and action pairs, processes in accordance with a variety of embodiments of the invention allow recovering rewards for each transition (s, a, s') using the learnt Q-values as follows:

$$r(s, a, s') = Q(s, a) - \gamma V^{\pi}(s') \tag{11}$$

Now, $$E_{s' \sim \mathcal{P}(\cdot|s,a)}[Q(s, a) - \gamma V^{\pi}(s')] = Q(s, a) - \gamma \mathbb{E}_{s' \sim \mathcal{P}(\cdot|s,a)}[V^{\pi}(s')] = \mathcal{T}^{\pi} Q(s, a).$$

By marginalizing over next-states, the expression correctly recovers the reward over state-actions. Thus, Eq. 11 gives the reward over transitions. In certain embodiments, rewards utilize s' which can be sampled from the environment, or by using a dynamics model. Recovered rewards may depend on environment dynamics, preventing trivial use on reward transfer settings. In many embodiments, reward models can be trained from the trained soft-Q model to make the rewards explicit.

Figure 3:
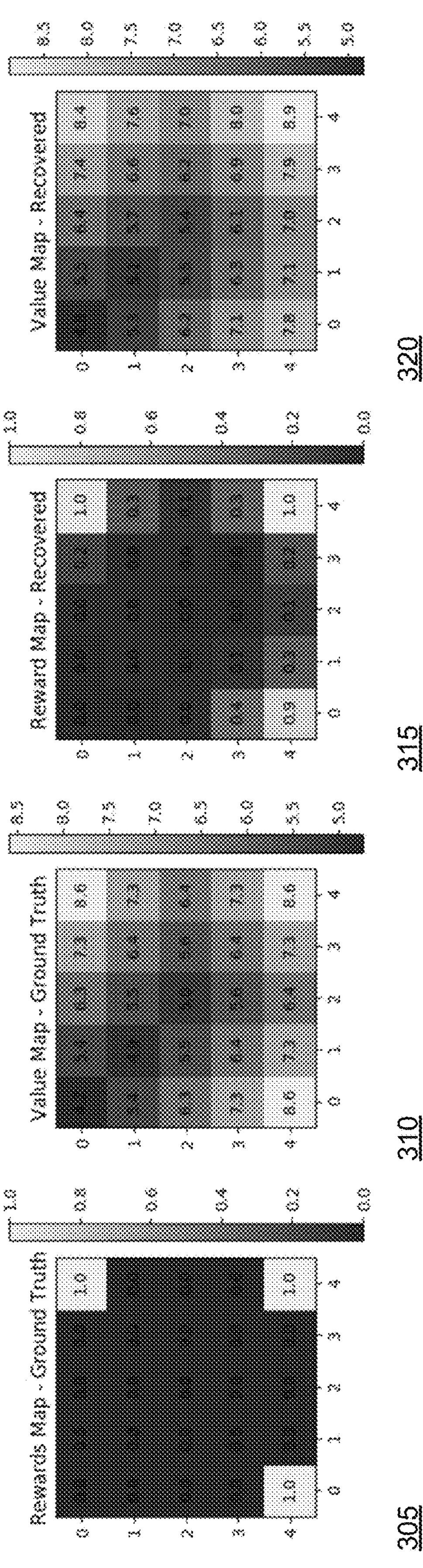
FIG. 3 illustrates an example of a visualization of recovered rewards.

Rewards recovered in accordance with many embodiments of the invention may closely reflect true rewards of an environment. An example of a visualization of recovered rewards are illustrated in FIG. 3. In this example, the rewards are from a discrete GridWorld environment with 5 possible actions: up, down, left, right, stay. This figure shows ground truth rewards map 305, ground truth value map 310, recovered rewards map 315, and recovered value map 320. As shown, the recovered rewards map 315 and value map 320 are quite similar to the ground truth rewards map 305 and value map 310, respectively. Rewards in accordance with some embodiments of the invention can be used to provide interpretability for a trained policy, making them more reliable and trustable. In a variety of embodiments, rewards can be used to score or evaluate policies.

Systems and methods in accordance with certain embodiments of the invention can implement total variation (TV) and/or $W_1$ distances. The $\chi^2$-divergence, corresponds to $$\phi(x) = x - \frac{1}{4\alpha}x^2.$$

Substituting in Eq. 9:

$$\max_{Q \in \Omega} \mathbb{E}_{\rho_E}\left[\left(Q(s, a) - \gamma \mathbb{E}_{s' \sim \mathcal{P}(\cdot|s,a)} V^*(s')\right)\right] - (1-\gamma)\mathbb{E}_{p_0}[V^*(s_0)] - \frac{1}{4\alpha}\mathbb{E}_{\rho_E}\left[\left(Q(s, a) - \gamma \mathbb{E}_{s' \sim \mathcal{P}(\cdot|s,a)} V^*(s')\right)^2\right]$$

In a fully offline setting, this can be further simplified as:

$$\min_{Q \in \Omega} -\mathbb{E}_{\rho_E}[(Q(s, a) - V^*(s))] + \frac{1}{4\alpha}\mathbb{E}_{\rho_E}\left[\left(Q(s, a) - \gamma \mathbb{E}_{s' \sim \mathcal{P}(\cdot|s,a)} V^*(s')\right)^2\right] \tag{12}$$

Previous works propose learning rewards that are only a function of the state, and claim that these form of reward functions generalize between different MDPs. Imitation learning in accordance with several embodiments of the invention can predict state-only rewards by using the policy and expert state-marginals. State-only rewards in accordance with certain embodiments of the invention can be predicted with a modification to Eq. 9:

$$\max_{Q \in \Omega} \mathcal{J}^*(Q) = \mathbb{E}_{s \sim \rho_E(s)}\left[\mathbb{E}_{a \sim \pi(\cdot|s)}\left[\phi\left(Q(s, a) - \gamma \mathbb{E}_{s' \sim \mathcal{P}(\cdot|s,a)} V^*(s')\right)\right]\right] - (1-\gamma)\mathbb{E}_{p_0}[V^*(s_0)]$$

Interestingly, the objective no longer depends on the expert actions $\pi_E$ and can be used for IL using only observations.

D. Systems for Imitation Learning

1. Imitation Learning System

Figure 4:
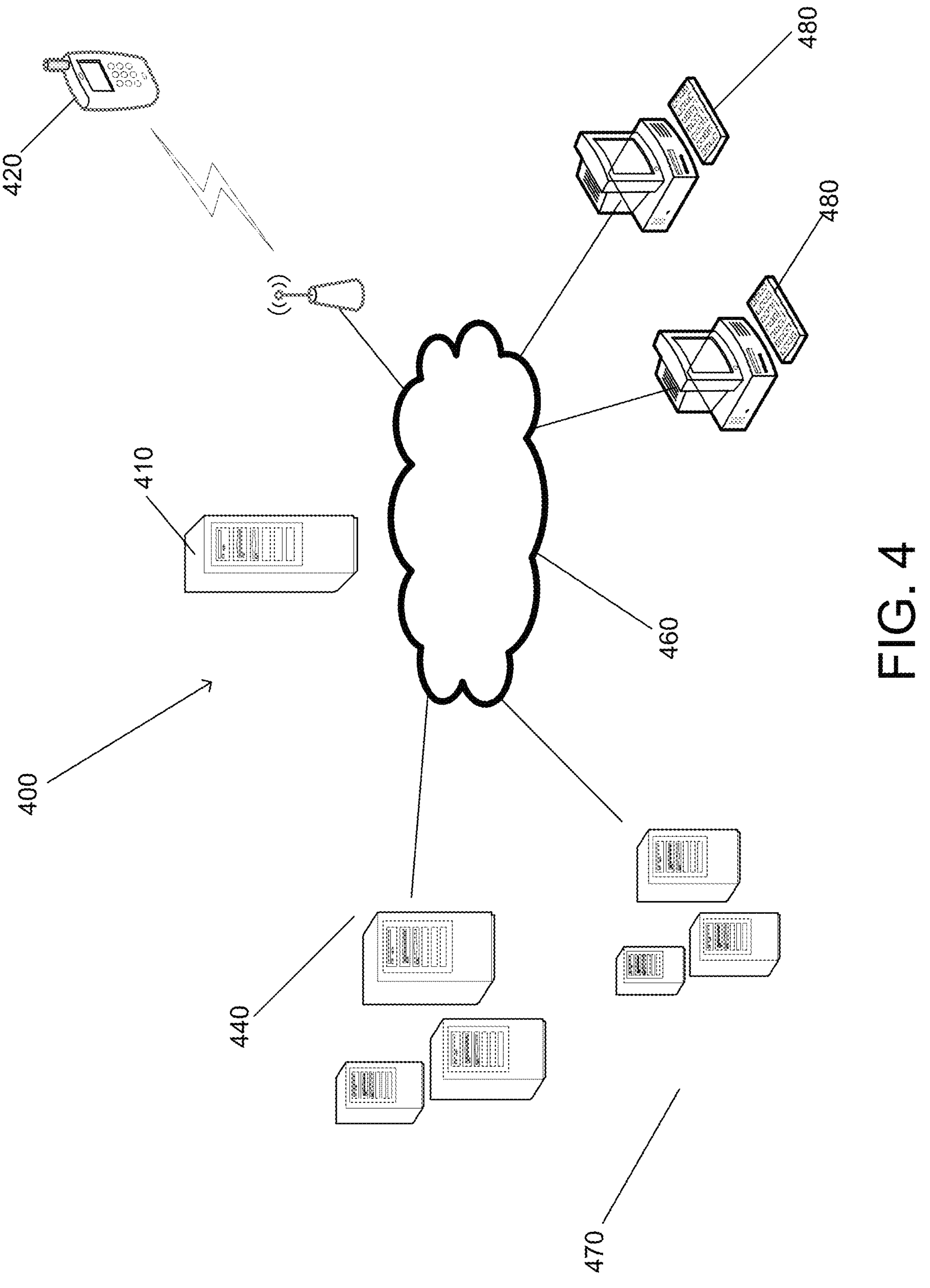
FIG. 4 illustrates an example of an imitation learning system that learns via imitation in accordance with an embodiment of the invention.

An example of an imitation learning system that learns via imitation in accordance with an embodiment of the invention is illustrated in FIG. 4. Network 400 includes a communications network 460. The communications network 460 is a network such as the Internet that allows devices connected to the network 460 to communicate with other connected devices. Server systems 410, 440, and 470 are connected to the network 460. Each of the server systems 410, 440, and 470 is a group of one or more servers communicatively connected to one another via internal networks that execute processes that provide cloud services to users over the network 460. One skilled in the art will recognize that an imitation learning system may exclude certain components and/or include other components that are omitted for brevity without departing from this invention.

For purposes of this discussion, cloud services are one or more applications that are executed by one or more server systems to provide data and/or executable applications to devices over a network. The server systems 410, 440, and 470 are shown each having three servers in the internal network. However, the server systems 410, 440 and 470 may include any number of servers and any additional number of server systems may be connected to the network 460 to provide cloud services. In accordance with various embodiments of this invention, an imitation learning system that uses systems and methods that learn via imitation in accordance with an embodiment of the invention may be provided by a process being executed on a single server system and/or a group of server systems communicating over network 460.

Users may use personal devices 480 and 420 that connect to the network 460 to perform processes that learn via imitation in accordance with various embodiments of the invention. In the shown embodiment, the personal devices 480 are shown as desktop computers that are connected via a conventional "wired" connection to the network 460. However, the personal device 480 may be a desktop computer, a laptop computer, a smart television, an entertainment gaming console, or any other device that connects to the network 460 via a "wired" connection. The mobile device 420 connects to network 460 using a wireless connection. A wireless connection is a connection that uses Radio Frequency (RF) signals, Infrared signals, or any other form of wireless signaling to connect to the network 460. In the example of this figure, the mobile device 420 is a mobile telephone. However, mobile device 420 may be a mobile phone, Personal Digital Assistant (PDA), a tablet, a smart-phone, or any other type of device that connects to network 460 via wireless connection without departing from this invention.

As can readily be appreciated the specific computing system used to learn via imitation is largely dependent upon the requirements of a given application and should not be considered as limited to any specific computing system(s) implementation.

2. Imitation Learning Element

Figure 5:
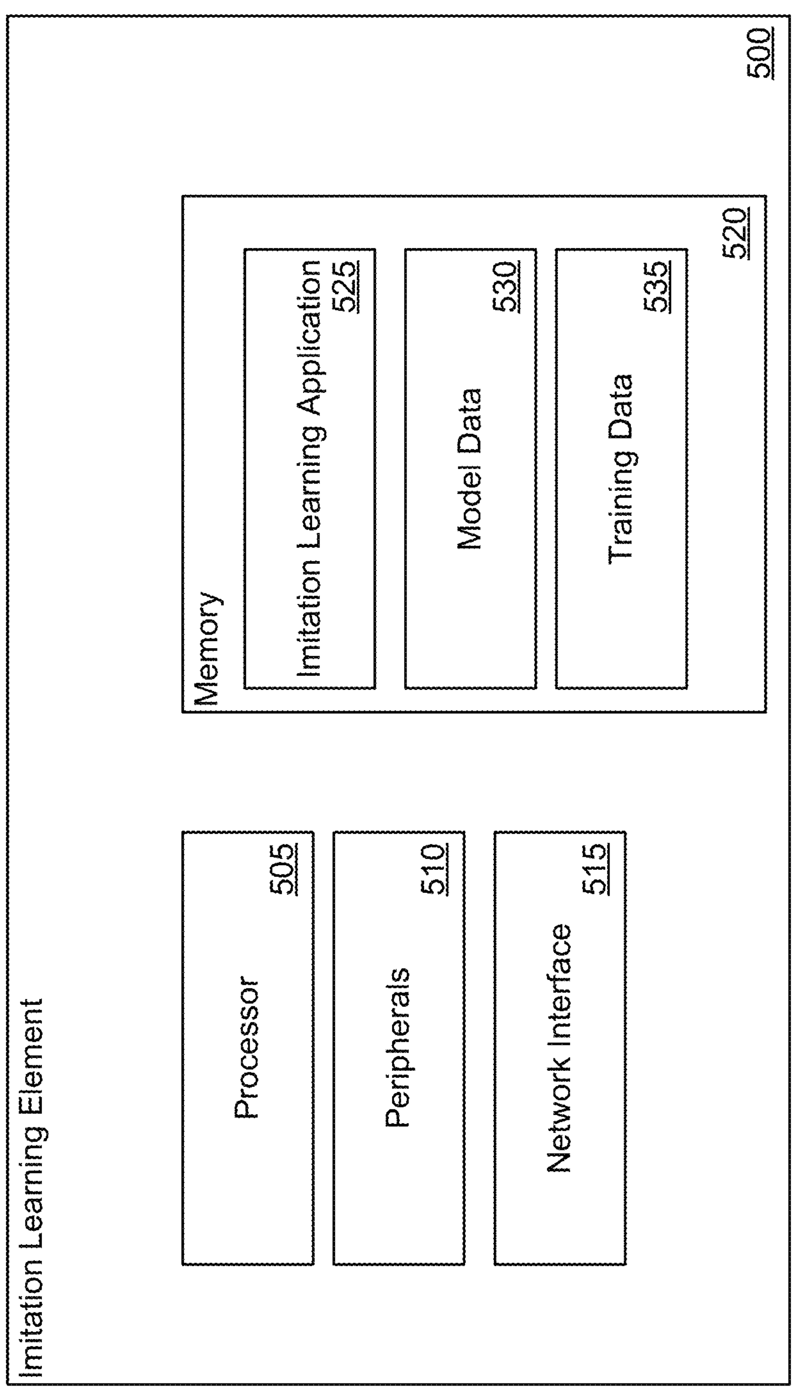
FIG. 5 illustrates an example of an imitation learning element that executes instructions to perform processes that learn via imitation in accordance with an embodiment of the invention.

An example of an imitation learning element that executes instructions to perform processes that learn via imitation in accordance with an embodiment of the invention is illustrated in FIG. 5. Imitation learning elements in accordance with many embodiments of the invention can include (but are not limited to) one or more of mobile devices, cameras, and/or computers. Imitation learning element 500 includes processor 505, peripherals 510, network interface 515, and memory 520. One skilled in the art will recognize that an imitation learning element may exclude certain components and/or include other components that are omitted for brevity without departing from this invention.

The processor 505 can include (but is not limited to) a processor, microprocessor, controller, or a combination of processors, microprocessor, and/or controllers that performs instructions stored in the memory 520 to manipulate data stored in the memory. Processor instructions can configure the processor 505 to perform processes in accordance with certain embodiments of the invention. In various embodiments, processor instructions can be stored on a non-transitory machine readable medium.

Peripherals 510 can include any of a variety of components for capturing data, such as (but not limited to) cameras, displays, and/or sensors. In a variety of embodiments, peripherals can be used to gather inputs and/or provide outputs. Imitation learning element 500 can utilize network interface 515 to transmit and receive data over a network based upon the instructions performed by processor 505. Peripherals and/or network interfaces in accordance with many embodiments of the invention can be used to gather inputs that can be used to learn via imitation.

Memory 520 includes an imitation learning application 525, model data 530, and training data 535. Imitation learning applications in accordance with several embodiments of the invention can be used to learn via imitation.

In several embodiments, model data can store various parameters and/or weights for various models that can be used for various processes as described in this specification, such as (but not limited to) Q-functions, reward models, policy models, dynamics models, etc. Model data in accordance with many embodiments of the invention can be updated through training on data captured on an imitation learning element or can be trained remotely and updated at an imitation learning element.

Training data in accordance with some embodiments of the invention can include expert data gathered from performance of a task by an expert agent. In many embodiments, training data may include (but is not limited to) expert trajectories, environmental data, etc. Expert trajectories in accordance with a number of embodiments of the invention can include trajectories obtained from one or multiple different sources. In a variety of embodiments, expert trajectories may include optimal and/or non-optimal behavior. In various embodiments, expert trajectories can include (partial) expert states without expert actions, such as (but not limited to) in the form of videos.

Although a specific example of an imitation learning element 500 is illustrated in this figure, any of a variety of imitation learning elements can be utilized to perform processes for imitation learning similar to those described herein as appropriate to the requirements of specific applications in accordance with embodiments of the invention.

3. Imitation Learning Application

Figure 6:
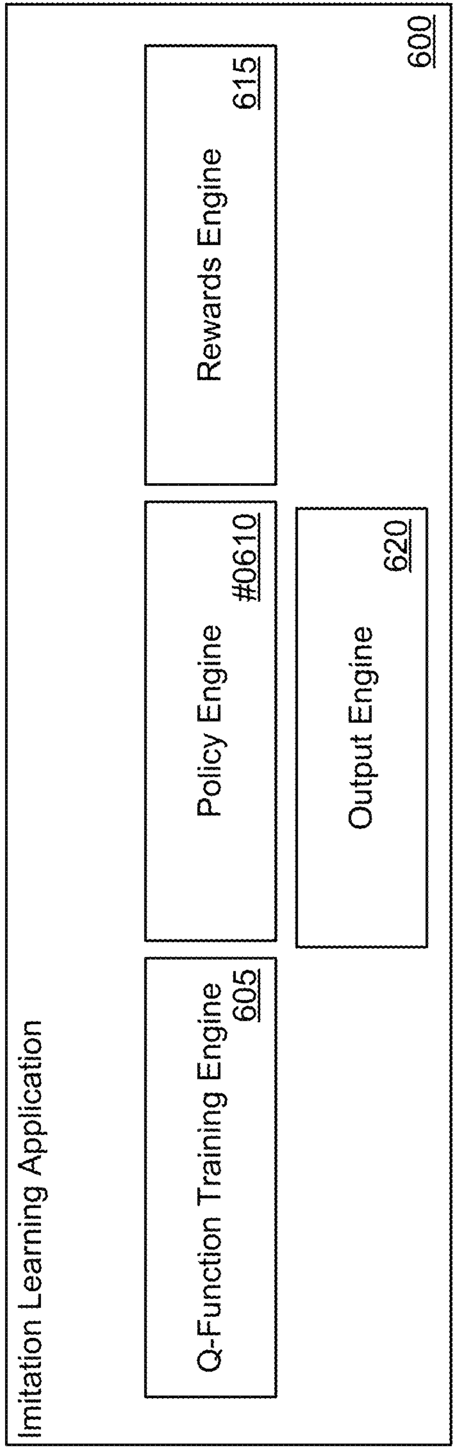
FIG. 6 illustrates an example of an imitation learning application for imitation learning in accordance with an embodiment of the invention.

An example of an imitation learning application for imitation learning in accordance with an embodiment of the invention is illustrated in FIG. 6. Imitation learning application 600 includes Q-function training engine 605, policy engine 610, rewards engine 615, and output engine 620. One skilled in the art will recognize that an imitation learning application may exclude certain components and/or include other components that are omitted for brevity without departing from this invention.

Q-function training engines in accordance with various embodiments of the invention can train Q-functions using various methods as disclosed herein. In a number of embodiments, Q-function training engines can train a single Q-function based on a non-adversarial objective in order to determine a policy and/or reward. Non-adversarial objectives in accordance with numerous embodiments of the invention can be based on one or more expert trajectories. Q-function training engines in accordance with numerous embodiments of the invention can operate in an offline mode, to learn Q-functions from one or more expert trajectories. In certain embodiments, Q-function training engines can operate in an online mode, using both expert trajectories and inputs from an environment to train Q-functions.

Rewards engines in accordance with many embodiments of the invention determine rewards for an environment. In many embodiments, rewards engines can compute rewards based on trained Q-functions form Q-function training engines. Rewards engines in accordance with a variety of embodiments of the invention can learn state-only rewards.

In certain embodiments, policy engines can be used to determine policies. Policies in accordance with numerous embodiments of the invention can be determined based on Q-functions trained by Q-function training engines. In many embodiments, policies can be iteratively trained along with the Q-functions using soft actor-critic (SAC) methods. Policy engines in accordance with several embodiments of the invention can learn policies based on rewards functions from rewards engines that are determined based on Q-functions from Q-function training engines.

Output engines in accordance with several embodiments of the invention can provide a variety of outputs to a user, including (but not limited to) control signals, notifications, alerts, and/or reports. In a variety of embodiments, output engines can interact with an agent in an environment to control the agent based on policies and/or rewards learned from the training.

Although a specific example of an imitation learning application is illustrated in this figure, any of a variety of imitation learning applications can be utilized to perform processes for imitation learning similar to those described herein as appropriate to the requirements of specific applications in accordance with embodiments of the invention.

Although specific methods of imitation learning are discussed above, many different methods of imitation learning can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for imitation learning, the method comprising:
 training, with a processor, a Q-function using a non-adversarial objective based on a set of one or more expert trajectories;
 determining a policy for controlling an output device with the processor, based on the trained Q-function; and
 iteratively updating with the processor, for a particular duration:
  the trained Q-function based on the determined policy; and
  the determined policy based on the trained Q-function.

2. The method of claim 1, wherein training the Q-function is performed with gradient descent to convergence.

3. The method of claim 1, wherein training the Q-function comprises sampling from at least one of an expert distribution; or a replay buffer.

4. The method of claim 1, further comprising, after the particular duration, applying a version of the determined policy to operating the output device, using the processor.

5. The method of claim 1, wherein determining the policy is done based on formula:

$$\pi := \frac{1}{z}\exp Q_\theta,$$

where:
 $\exp Q_\Theta$ represents an expected cumulative reward produced by the trained Q-function; and
 Z represents a normalization factor.

6. The method of claim 1, wherein the non-adversarial objective is computed in a γ-discounted infinite horizon setting.

7. The method of claim 1, wherein training the Q-function is further based on a set of input rewards.

8. The method of claim 1, wherein the non-adversarial objective does not rely on a particular reward as input.

9. The method of claim 1, further comprising using the determined policy to drive an artificial intelligence (AI) bot.

10. The method of claim 1, wherein determining the policy is based on an expected cumulative reward produced by the trained Q-function.

11. The method of claim 1, wherein updating the determined policy based on the Q-function comprises determining a new reward based on the trained Q-function.

12. The method of claim 11, wherein the new reward is determined based on $$r(s, a, s') = Q(s, a) - \gamma V^\pi(s'),$$

where:
 s represents current state information;
 a represents action information;
 s' represents post-action state information;
 $V^\pi$ represents a state-value function using the determined policy;
 Q( ) represents the trained Q-function; and
 γ represents a discount factor.

13. A system utilizing an imitation learning model to control operation, comprising:
 a processor; and
 a memory, where the memory contains a control application capable of directing the processor to control the operation of an output device by:
  obtaining current state information of the output device; and;
  providing the current state information to an imitation learning model, where the imitation learning model uses a single Q-function, and the imitation learning model is trained by:
   training the single Q-function using a non-adversarial objective based on a set of one or more expert trajectories;
   determining a policy based on the trained Q-function; and
   iteratively updating, for a particular duration:
    the trained Q-function based on the determined policy; and
    the determined policy based on the Q-function; and
  obtaining control data, applied to controlling the output device, from the imitation learning model based on a final version of the determined policy.

14. The system of claim 13, wherein the output device is at least one selected from the group consisting of a medical device, a video game device, a robot, and an autonomous vehicle.

15. The system of claim 13, wherein training the Q-function is performed with gradient descent to convergence.

16. The system of claim 13, wherein training the Q-function comprises sampling from an expert distribution and sampling from a replay buffer, wherein the replay buffer comprises the current state information.

17. The system of claim 13, wherein determining the policy is done based on formula:

$$\pi := \frac{1}{z}\exp Q_\theta,$$

where:
 $\exp Q_\Theta$ represents an expected cumulative reward produced by the trained Q-function; and
 Z represents a normalization factor.

18. The system of claim 13, wherein updating the determined policy based on the Q-function comprises determining a new reward based on the trained Q-function, wherein the new reward is determined based on $$r(s, a, s') = Q(s, a) - \gamma V^\pi(s'),$$

where:
 s represents the current state information;
 a represents action information;
 s' represents post-action state information;
 $V^\pi$ represents a state-value function using the determined policy;
 Q( ) represents the trained Q-function; and
 γ represents a discount factor.

19. A non-transitory machine-readable medium containing processor instructions for imitation learning, wherein execution of the processor instructions by a processor causes the processor to perform a process that comprises:

initializing a Q-function;

training the Q-function using a non-adversarial objective based on a set of one or more expert trajectories;

determining a policy for controlling an output device based on the trained Q-function; and iteratively updating, for a particular duration:

the trained Q-function based on the determined policy; and the determined policy based on the Q-function.

20. The non-transitory machine-readable medium of claim 19, wherein updating the determined policy based on the Q-function comprises determining a new reward based on the trained Q-function, the new reward determined based on $$r(s, a, s') = Q(s, a) - \gamma V^{\pi}(s'),$$

where:

s represents current state information;

a represents action information;

s' represents post-action state information;

$V^{\pi}$ represents a state-value function using the determined policy;

Q( ) represents the trained Q-function; and $\gamma$ represents a discount factor.

* * * * *